United States Patent
Richardson

[15] 3,659,498
[45] May 2, 1972

[54] RAM ATTITUDE CONTROL SYSTEM AND VALVE ASSEMBLY THEREFOR

[72] Inventor: Rolland A. Richardson, Alameda, Calif.
[73] Assignee: Pacific Press & Shear Corp.
[22] Filed: Aug. 13, 1970
[21] Appl. No.: 63,530

[52] U.S. Cl..................................91/171, 91/446, 91/452
[51] Int. Cl..................................F01b 25/04, F15b 11/22
[58] Field of Search.................................91/171, 44 C, 452

[56] References Cited

UNITED STATES PATENTS

| | | | |
|---|---|---|---|
| 2,484,908 | 10/1949 | Purcell...................................| 91/171 |
| 3,143,924 | 8/1964 | Pearson et al. ...........................| 91/171 |
| 3,349,669 | 10/1967 | Richardson..............................| 91/171 |

FOREIGN PATENTS OR APPLICATIONS 382,791   11/1932   Great Britain...........................91/171

Primary Examiner—Paul E. Maslousky
Attorney—Edward Brosler

[57] ABSTRACT

The ram attitude system of U.S. Pat. No. 3,349,669 of Oct. 31, 1967 is made less critical as to adjustments by incorporating a novel valve assembly for each of the two pumps, the valve assembly associated with the pump supplying the leading hydraulic motor, causing a continuously increasing by-pass of said hydraulic motor with deviation of the ram of a machine, to set up corresponding corrective forces in a non-proportional manner but with no sharp changes in such corrective forces.

5 Claims, 3 Drawing Figures

INVENTOR.
ROLLAND A. RICHARDSON
BY Edward Brosler
ATTORNEY

Patented May 2, 1972

INVENTOR.
ROLLAND A. RICHARDSON

BY Edward Brosler

ATTORNEY

3,659,498

RAM ATTITUDE CONTROL SYSTEM AND VALVE ASSEMBLY THEREFOR

My invention is an improvement on that of my U.S. Pat. No. 3,349,669 of Oct. 31, 1967 for Ram Attitude Control System, which relates to machines such as hydraulically powered shears, press brakes or the like, in which a ram carrying a tool performs an operation on work; and which more particularly relates to a hydraulic leveling system for maintaining a level or pre-established attitude of the ram of such machine.

The system of my aforementioned patent developed a corrective effect which increased non-proportionally with the degree of deviation, thereby developing very powerful differential forces toward restoring the ram back to its attitude. At one point in the operation of the system, the powerful differential forces are developed by unloading the pump supplying power to the leading end of the ram, and in accomplishing this, use was made of an overload relief valve normally associated with each pump in the hydraulic system of the machine, but modified to take on this added function. It has been found, however, that adjustments of this ram attitude control system were quite critical and that a system in which the adjustments would be less critical, would be desirable.

Accordingly, among the objects of the present invention are:

1. To provide a novel and improved ram attitude control system;
2. To provide a novel and improved ram attitude control system which will impart to a machine, a smoother correction curve characteristic and thereby reduce the critical nature of adjustments of the system;
3. To provide a novel and improved ram attitude control system which will afford in part, an increase in response sensitivity over that of my aforementioned patent for out-of-level deviations of a ram;
4. To provide a novel and improved ram attitude control system which will impart to a machine, the improved characteristics of both preceding paragraphs [2] and [3];
5. To provide a novel and improved valve assembly for such ram attitude control system.

Additional objects of my invention will be brought out in the following description of a preferred embodiment of the same, taken in conjunction with the accompanying drawings, wherein.

Figure 1:
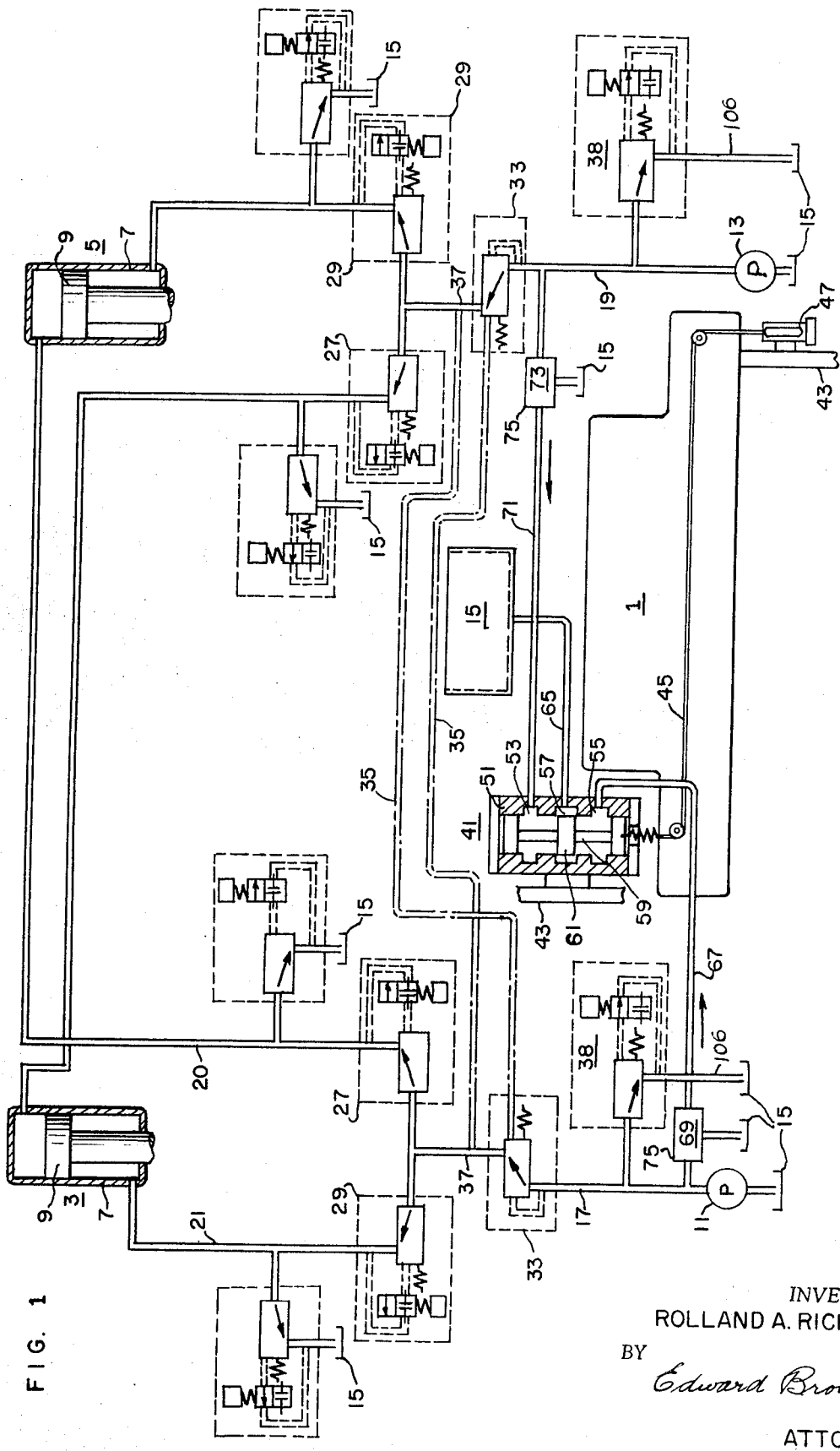
FIG. 1 is schematic view of a hydraulic system of a shear or the like, incorporating the hydraulic leveling system of the present invention.

Referring to the drawings for details of my invention in its preferred form, I have depicted in outline, the ram 1 of a machine, and displaced therefrom, a pair of hydraulic motors 3 and 5, each comprising a cylinder 7 and an included drive piston 9, it being understood, that each motor will be coupled to a different end of the ram.

These drive motors are supplied with hydraulic liquid from a pair of pumps 11 and 13, supplied with hydraulic liquid from a tank 15, each pump having a discharge line 17, 19 respectively, with a flow connection in the form of a branch line 20 to the upper end of one of the motor cylinders 7, and another branch line 21 to the lower end of the other motor cylinder. Expressed in other words, one branch line 19 extends to the drive side of the one piston, while the other branch line 21 extends to the lift side of the other piston.

Selectively operable valve means in the form of a solenoid control valve 27 in one branch line and solenoid control valve 29 in the other branch line, from each pump will cause each pump to supply power to one hydraulic motor for a work stroke and power to the other hydraulic motor for a return or lift stroke. This has the advantage over a system where each pump supplied the power for the work stroke and the lift stroke to the same hydraulic motor, for such system necessitates a reversing of the hydraulic lines to each hydraulic motor when changing from a work stroke to a lift stroke, which in turn requires a corresponding reversal of lines in a leveling system incorporated in such system.

In each pump discharge line is a blocking valve assembly 33, which is so designed as to normally open in accordance with the work load on the pump which is feeding liquid therethrough. The resistance to opening of such valve may be controlled in part by a flow connection 35 from the discharge line of the other pump, at a point 37 downstream of the blocking valve in that line, whereby the flow connection will transmit the load pressure from the one discharge line to the control element in the blocking valve in the other discharge line. With such an arrangement, each blocking valve will respond to the load condition at the far end of the ram, to so adjust the loading on its associated pump as to maintain substantially equal loading on the pumps, despite any unbalancing of the work load on the hydraulic motors.

Coupled to the discharge side of each pump is a relief valve assembly 38 to connect the associated pump to tank in the event of an overload on such pump, and both may be electrically energized to idle the machine. While these relief valve assemblies play an important part in the system of my aforementioned patent, they are not involved in the system of the present invention.

A system of the character described above, is disclosed in my patent for Precision Control System For Press Brakes Or The Like, U.S. Pat. No. 2,906,096 of Sept. 29, 1959, and is used as a basis for the disclosure of the present invention, because of the added advantages which the invention offers when employed in conjunction with such a system. A servo-valve assembly 41, similar to that of my U.S. Pat. No. 3,349,669 is mounted on the frame 43 of the machine, in position to be stimulated by a leveling tape 45 affixed in a conventional manner across the backside of the ram, to be anchored at its opposite end to a fixed point of anchorage 47 on the frame.

Such servo-valve assembly comprises a housing 51 having a pair of intake ports 53, 55 and an intermediate exhaust port 57 and a valve 59 in the form of a spool slidable in said housing and having a valve element 61 of a length which preferably is slightly less than the exposed dimension of the exhaust port 57 whereby, when the spool is adjusted to neutral position as depicted, it will permit of a slight but equal flow through each of the intake ports, and the valve assembly in this condition, may be said to be hydraulically balanced.

Any movement of the valve in either direction away from its neutral position, will permit of an increase in flow through one intake port, while reducing the flow through the other intake port, until a cut-off point is reached at one side of the exhaust port. Thus the flow in a line to one intake port may be said to be modulated in a positive direction, while the flow in a line to the other port may be said to be negatively modulated, and accordingly, the overall flow in a system in which such valve assembly may be employed, may be referred to as double modulated.

This servo-valve assembly has its exhaust port flow connected, by piping 65 to tank 15, and of the two intake ports, a flow connection 67 from the discharge line 17 of pump 11 connects to one of these intake ports, and includes an amplifier valve assembly 69, while another flow connection 71 connects the discharge line 19 of pump 13 to the other intake port, and includes an amplifier valve assembly 73, similar to the other.

Figure 2:
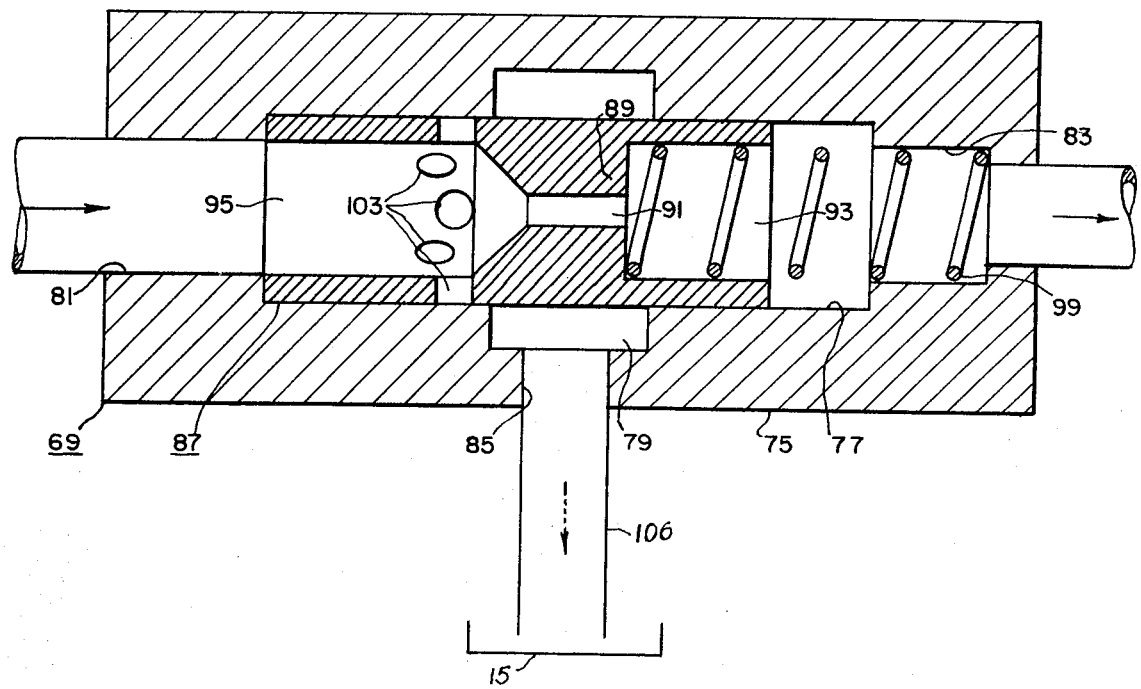
FIG. 2 is a view in section through a valve assembly constituting an important feature of the hydraulic leveling system of FIG. 1.

The details of such amplifier valve assembly are depicted in FIG. 2 and are important to the present invention. Referring to this figure of the drawings, such assembly involves a valve housing 75 having an internal cylindrical bore to form a valve chamber 77, and a circular channel 79 intermediate the ends of said chamber in the wall thereof, with an intake port 81 at one end of the housing in communication with the proximate end of said valve chamber and an exhaust port 83 at the other end, in communication with the other end of said chamber. Intermediate the ends of said housing is a radial exhaust port 85 in communication with the circular channel 79.

Within the bore 77 is a relative thin wall cylindrical valve 87 having an intermediate partition wall 89 with a restricted axial passage 91 therethrough, this wall dividing the valve into two end compartments 93, 95, the former to function as a recess to seat a compression spring 99 installed between the valve and a shoulder at the exhaust port. This spring normally urges the valve to the far end of the valve chamber, which determines the normal position of this valve.

In proximity to the partition wall 89, the wall of the other valve chamber is provided with one or more perforations 103, adapted to place the intake port 81 in flow communication with the radial exhaust port 85 as the valve is shifted against the action of the spring.

With the pump discharge connected to the intake port, and the exhaust port connected to an intake port of the servo-valve assembly 41, full pump pressure will be applied to the valve causing a normal minor flow of hydraulic liquid as determined by the restricted passage 91 through the valve 87 and the slight clearance provided in the servo-valve assembly when the valve is in its neutral position. Under these conditions, total resistance to movement of the valve 87 is such as to preclude movement thereof under prevailing pump pressure applied thereto, or in other words, the pressure drop across the valve is insufficient to cause movement thereof.

Upon deviation of the ram 1 from its desired prevailing attitude, the exhaust port 57 of the servo-valve assembly opens wider to one of the intake ports and becomes closed off to the other intake port depending on the direction of the deviation. Thus the resistance to movement of that amplifier valve associated with the intake port of the servo-valve assembly which is closed off is increased, while resistance to movement of the other amplifier valve is reduced. As to the latter, the pump pressure applied thereto can effect movement against the spring action in accordance with the degree of such reduced resistance, which in turn is a function of the deviation of the ram. Movement of the valve in the one amplifier valve assembly will place the exhaust port 85 in communication with the associated pump, and by connecting this exhaust port to tank, as by a pipe connection 106, the pump, in question, will discharge directly to tank in accordance with the degree of exposure of the exhaust port to the pump.

Thus a bleeding of fluid from this side of the hydraulic power system occurs and by connecting the piping 67 and 71 to the proper intake ports of the servo-valve assembly, such bleeding can be made to occur in that portion of the system associated with the leading end of the ram, whereby to effect a differential corrective force in the direction of re-establishing the ram to its previous desired attitude.

An important feature of the present invention lies in the amplifier valve assembly, because by adjusting the number, size, shape or location of the perforations 103, one can determine the shape of the characteristic curve which establishes the relationship of the rate of correction for linear movement of the servo-valve, such linear movement, in turn, being a measure of undesired deviation of the ram from its desired attitude.

Figure 3:
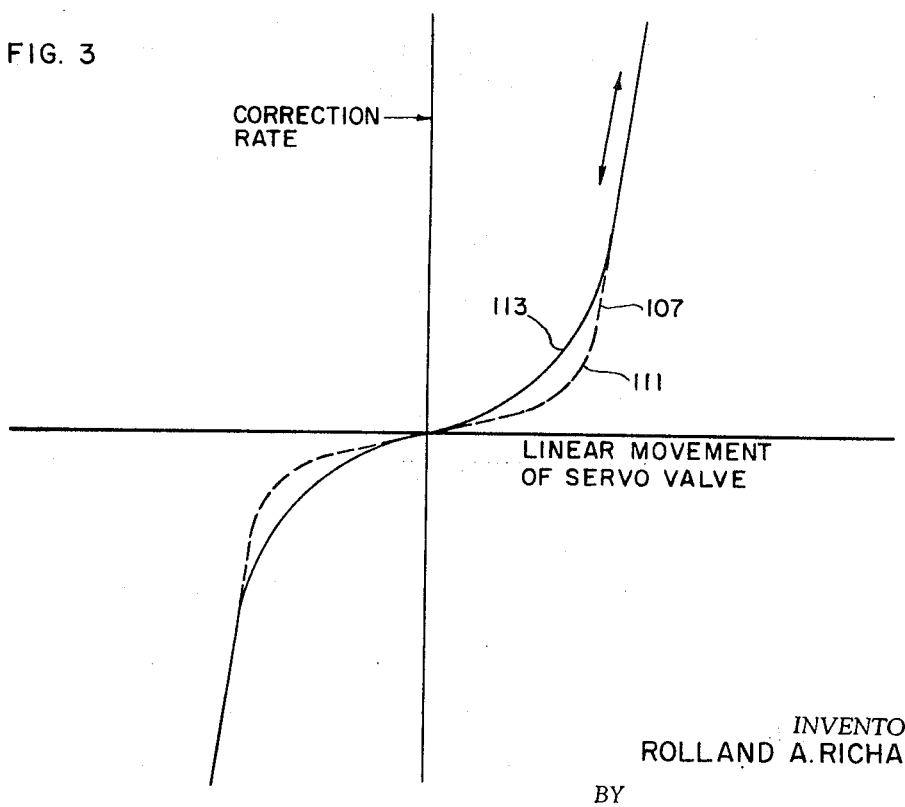
FIG. 3 is a view depicting the response characteristic of the leveling system of the present invention as compared to that of my aforementioned patented system.

This feature was not available in the system of my aforementioned patent, wherein as shown in FIG. 3 of that patent and reproduced as dash curve 107 in FIG. 3 of the present application, the characteristic curve included rather sharp bends 111. This made adjustments to the system rather critical.

By adjusting the perforations in the valve, the sharp bends in the characteristic curve may be eliminated and in lieu thereof, a bend 113 of large radius may be introduced. This not only reduces the critical nature of adjustments to the system, but provides for a smooth transition from the region of maximum corrective values to the region approaching final restoration of the ram to its desired attitude. Not only will the leveling control system provide these advantages, but it will also be noted that the system becomes more effective, in that the corrective forces represented along the lower portion of the dash curve, come into play sooner, and thus begin effective correction earlier. From this, one may expect that a ram having a tendancy to deviate from its desired attitude will not deviate quite as much under the present system as under that of my aforementioned patent, despite the fact that the system of my patent is extremely effective compared to known prior art systems.

The system of the present invention thus retains all the characteristics and advantages of the non-proportional system of my aforementioned patent, while improving thereon in the respects noted.

More specifically as to the perforations 103, in the preferred form of the invention, they are depicted circular and in two rows, with alternate openings staggered but overlapping with respect to adjacent openings. Thus, as the openings of the first row approach full exposure to the exhaust opening 85, the openings of the second row begin exposure, thereby adding to the exposed area provided by the first row of openings, to provide exposure in a continuously increasing manner. The curvature at the bend 113 of the characteristic curve becomes a function of the rate of overall area exposure through the openings 103, as the valve shifts, and thus may be given a larger radius of curvature at 113 than can be realized in the system of my aforementioned patent.

A single opening, by altering its contour to provide the same continuously increasing exposure with shifting of the valve, as the overall area exposure obtained with the two rows of openings 103, will enable like results.

It will be apparent that the system of the present invention will accomplish the results attributed thereto, and while I have illustrated and described the same in its preferred form, it is subject to alteration and modification without departing from the underlying principles involved.

I claim:

1. A ram attitude control system for a hydraulically powered machine such as a press brake, shear, or the like, having a ram of substantial length, a hydraulic motor at each end of the ram, including a cylinder and a drive piston therein, a pump for each of said hydraulic motors, and tank means for supplying hydraulic fluid to said pumps, a discharge line from each of said pumps in flow connection to one of said hydraulic motors, said ram attitude control system comprising a servo-valve assembly including a housing having a valve chamber with a pair of intake ports and an exhaust port, and a valve slidably disposed for movement in opposite directions within said chamber and adapted to cut off one or the other of said intake ports, means flow connecting each of said pumps to a different one of said intake ports, and an amplifier valve assembly in each of said flow connecting means, said amplifier valve assembly including a valve housing having a valve chamber, an intake port and a pair of exhaust ports in flow connection with said valve chamber, a valve movably installed in said valve chamber and normally positioned to block one of said exhaust ports, said valve having a restricted flow connection therethrough to the other exhaust port, and means for continuously and increasingly exposing said normally blocked exhaust port to said intake port throughout a substantial portion of movement of said valve.

2. A ram attitude control system in accordance with claim 1, characterized by said normally blocked exhaust port flow connecting with said amplifier valve chamber at an intermediate location thereof, and said valve having a restricted passage therethrough flow connecting said intake port with said other exhaust port, and means in the wall of said amplifier valve adapted to flow connect said intake port to said intermediately located exhaust port as said valve is shifted from its normal blocking position.

3. A ram attitude control system in accordance with claim 2 characterized by said flow connecting means in the wall of said amplifier valve including at least one hole having an overall area increasing non-proportionally as said valve is shifted from its normal blocking position.

4. A ram attitude control system in accordance with claim 3 characterized by said overall flow area being increasingly exposed to said normally blocked exhaust port, during movement of said valve from its normal blocking position.

5. A ram attitude control system in accordance with claim 4 characterized by said overall flow area being increasingly and non-proportionally exposed with such movement of said valve.

* * * * *